United States Patent [19]

Masuzawa

[11] Patent Number: 4,465,452
[45] Date of Patent: Aug. 14, 1984

[54] FOOD EXTRUDER

[75] Inventor: Osamu Masuzawa, Yokohama, Japan

[73] Assignee: The Nisshin Oil Mills, Limited, Japan

[21] Appl. No.: 291,329

[22] Filed: Aug. 10, 1981

[30] Foreign Application Priority Data

Aug. 21, 1980 [JP] Japan .............................. 55-114926

[51] Int. Cl.³ ...................... B21C 3/04; B21C 11/18; B21C 5/00
[52] U.S. Cl. .................................. 425/308; 425/377; 425/464
[58] Field of Search ............... 425/308, 376 R, 378 R, 425/378 S, 379 S, 461, 464, 308, 377; 426/516, 517; 99/353, 509

[56] References Cited

U.S. PATENT DOCUMENTS

| | | | |
|---|---|---|---|
| 762,128 | 6/1904 | Bourquin | 425/464 |
| 992,369 | 5/1911 | Martoccio | 425/464 |
| 1,487,378 | 3/1924 | Gigliotti | 425/311 |
| 1,591,265 | 7/1926 | Baccellieri | 425/464 |
| 1,713,585 | 5/1929 | Wolf | 425/311 |
| 1,736,611 | 11/1929 | Lubrano | 425/311 |
| 1,774,671 | 9/1930 | Ronzoni et al. | 425/308 |
| 1,857,313 | 5/1932 | Maldari | 425/464 |
| 1,881,171 | 10/1932 | Cooley | 426/513 |
| 1,945,399 | 1/1934 | Guskea et al. | 425/308 |
| 1,955,342 | 4/1934 | Pizzini et al. | 425/311 |
| 2,149,920 | 3/1939 | Kretchmer | 425/311 |
| 2,351,493 | 6/1944 | Curry | 425/311 |
| 2,408,713 | 10/1946 | Webb | 425/464 |
| 2,420,616 | 5/1947 | Palmer | 425/376 R |
| 2,634,691 | 4/1953 | Flockhart | 425/308 |
| 3,344,752 | 10/1967 | Ilines | 425/182 |
| 3,456,466 | 7/1969 | Henry | 100/257 |
| 3,553,776 | 1/1971 | Romagano | 425/311 |
| 3,890,453 | 6/1975 | Harmon et al. | 426/516 |
| 4,060,367 | 11/1977 | Shatila et al. | 425/308 |
| 4,154,130 | 5/1979 | Smith et al. | 100/257 |

FOREIGN PATENT DOCUMENTS 49-101582 9/1974 Japan .
49-101578 9/1974 Japan .

OTHER PUBLICATIONS

Bailey, Industrial Oil and Fat Products, Interscience, N.Y., (1951), 134-137 & p. 499.
Hatton, Intro. to Hydraulic Fluids, Reinhold, N.Y., (1962), pp. 343 & 347.

Primary Examiner—Willard E. Hoag
Attorney, Agent, or Firm—Bacon & Thomas

[57] ABSTRACT

A food extruder comprises, a molding plate provided with a multitude of perforations each having a prescribed opening area, a drum having both upper and lower ends open, fitted with said molding plate at the bottom, and containing therein molding food material, a push cover disposed on the molding food material and capable of pressing the molding food material against said molding plate, an oil hydraulic pump having a movable handle lever and supplying oil under a given pressure by moving the handle lever, an oil hydraulic cylinder having a movable piston rod capable of engaging the push cover and causing the piston rod to move so that the push cover engaging the piston rod may press the molding food material against the molding plate by means of the oil supplied by the movement of the handle lever, a regulating mechanism capable of regulating the stroke of the handle lever, and a cutting mechanism for cutting portions of the pressed molding food material extruded from the drum through the perforations.

7 Claims, 8 Drawing Figures

FOOD EXTRUDER

BACKGROUND OF THE INVENTION

This invention relates to a compact, table-type food extruder used for offhand preparation of French fried potatoes or other snacks in fast-food restaurant chains, eating houses, stands of recreation grounds, beer halls, households, etc.

Conventionally, French fried potatoes are enjoying a large demand in the fast-food restaurant chains and other restaurants, etc. Especially, there has been an increasing demand for those fried potatoes which are prepared by mixing powdered potato mix with water, extruding the mixture into sticks by means of an extruding machine, and then frying the sticks of potato mix in a fryer. In response to such demand, table-type, handle-operated food extruding machines, called French fried potatoes extruders, have been developed and put to practical use.

These table-type food extruding machines, which are compact, light, and space-saving, can very easily be operated in any suitable places, such as shops, kitchens, etc. All these conventional machines of such type, however, are of a construction in which a pressing rod is lowered by handle operation with the aid of an entirely mechanical motion means, such as gears or link cams, thereby extruding molding food material (dough) in a drum. Therefore, the energy required for the handle operation is too great for a woman or child to cover. Further, because of their being food preparing machines, these prior art extruding machines do not allow a lubricant to be applied to their interlocking mechanical parts, so that they are liable to malfunction due to unsmooth operations. Moreover, these machines are not provided with any mechanism for regulating the handle stroke, so that it is difficult to adjust the extrusion length of food moldings when using molding plates with different shapes and different numbers of perforations for extrusion. Thus, the handle operation cannot help being delicate, depending entirely upon the operator's knack or tact.

SUMMARY OF THE INVENTION

This invention is contrived in consideration of the above-mentioned circumstances, and is intended to provide a very handy and advantageous food extruder, capable of energy-saving handle operation which is so easy that even a woman or child can handle the machine without difficulty, and of trouble-free, smooth operations, as well as handle operation stroke regulation to facilitate such operations.

DETAILED DESCRIPTION OF THE PREFERRED EMBODIMENT

Now there will be described in detail one embodiment of the food extruder according to the present invention with reference to the accompanying drawings.

Figure 1:
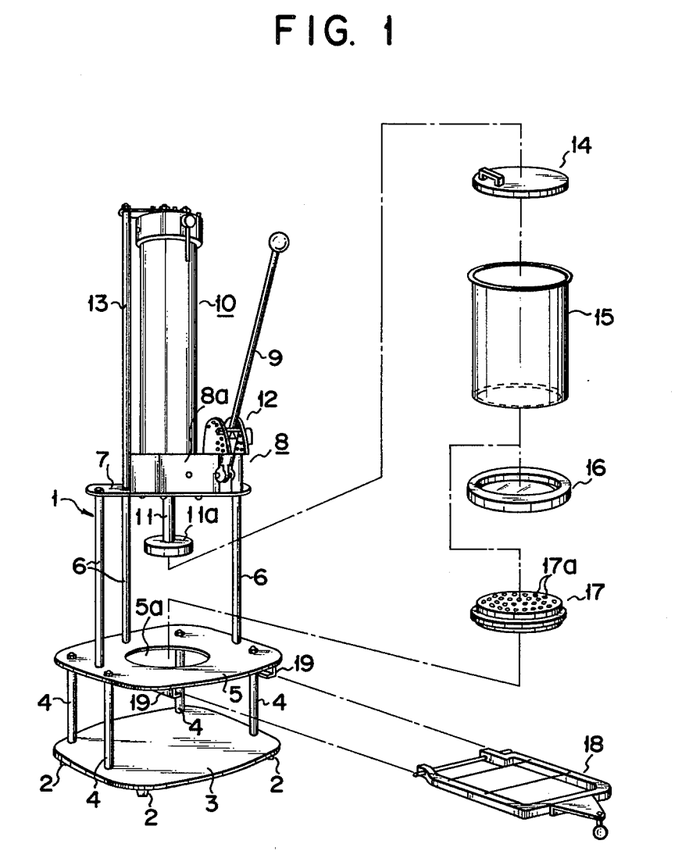
FIG. 1 is a perspective view showing one embodiment of the food extruder according to the present invention.

As shown in FIG. 1, the table-type food extruder has a main body 1 which includes a lower base 3 having a plurality of pedestals 2 on its under side; an intermediate cradle 5 horizontally sustained over the lower base 3 by means of four legs 4 substantially corresponding to the four corners of the lower base 3 and having a molding plate fitting hole 5a in the central portion thereof; a pump mounting base 7 horizontally sustained over the intermediate cradle 5 by means of three support rods 6 on both lateral sides and rear side of the intermediate cradle 5; a hand-type oil hydraulic pump 8 mounted on the pump mounting base 7 and having a handle lever 9; an oil hydraulic cylinder 10 integrally fixed upright on a casing 8a of the hand-type oil hydraulic pump 8 so as to have its lower end partially buried in the casing 8a, a piston rod 11 with its lower end extended downward through the casing 8a and the pump mounting base 7 being disposed inside the cylinder 10 so as to be able to move vertically; a handle operation stroke regulating mechanism 12 fixed on the top of the casing 8a, and a fall preventive commode handle 13 standing on the top of the pump mounting base 7 and coupled with the top head portion of the oil hydraulic cylinder 10.

Figure 2:
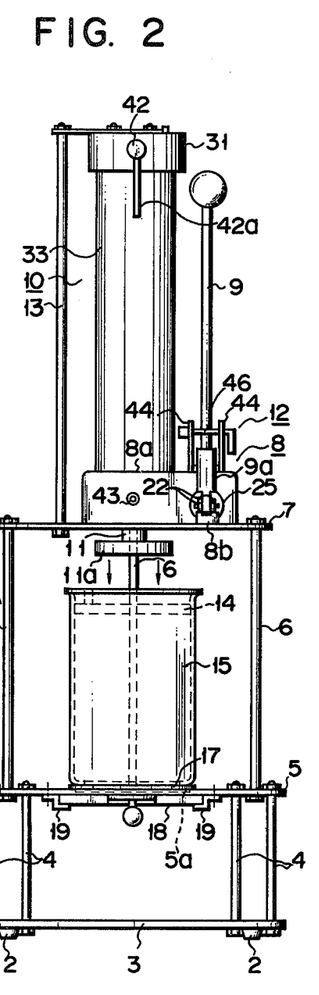
FIG. 2 is a front view of the food extruder of FIG. 1.
Figure 3:
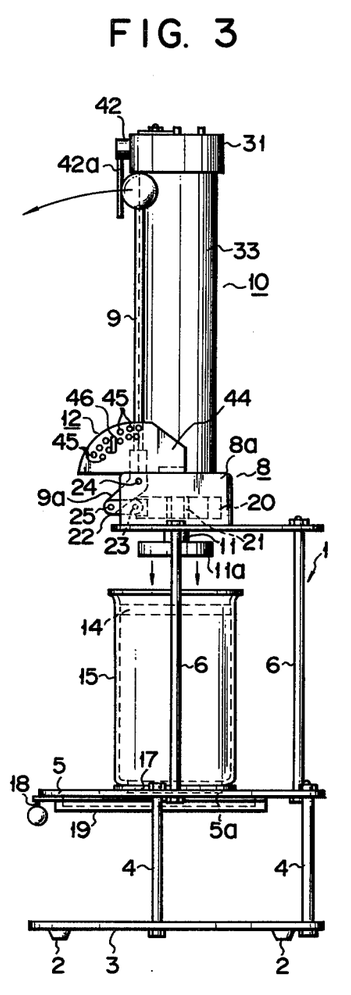
FIG. 3 is a side view of the food extruder of FIG. 1.

Provided as accessories are a push cover 14 having an outside diameter of a prescribed size, a hollow drum 15 having an inside diameter of a size a little greater than the prescribed size of the push cover 14 and opening at both upper and lower ends, a bottom cover 16, a molding plate 17 with a large number of perforations 17a, and a cutter 18 with piano-wire. The molding plate 17 is fitted from above in the molding plate fitting hole 5a of the intermediate cradle 5 of the main body 1, as shown in FIGS. 2 and 3. First, a given amount of powder material for French fried potatoes is put in the drum 15 with its lower end fitted with the bottom cover 16, and a given amount of water is added to the powder material. The material mixed with the water is allowed to stand for five minutes or thereabouts after it is well stirred, and thus molding food material called "dough" is prepared. Then, the push cover 14 is put on the molding food material in the drum 15, and the bottom cover 16 attached to the lower end of the drum 15 is removed. Thus, the lower end of the drum 15 is opened, and the drum 15 containing the molding food material therein is set on the molding plate 17, as shown in FIGS. 2 and 3. The piano-wire cutter 18 is slidably sustained under the intermediate cradle 5 of the main body 1 by means of a pair of guides 19 which are fixed to the under side of the intermediate cradle 5. Namely, as shown in FIGS. 2 and 3, the molding plate 17, the drum 15 containing the molding food material, and the push cover 14 are set in their respective predetermined positions.

Then, the handle lever 9 is operated, thus actuating the oil hydraulic pump 8. The piston rod 11 of the oil hydraulic cylinder 10 is thus moved down, and so does the pressing plate 11a attached to the lower end of the rod 11. The pressing plate 11a therefore pushes down the push cover 14. As a result, the molding food material is extruded from the drum 15 through the perforations 17a of the molding plate 17. The food material is thus shaped into strings. When the strings grows properly long, the piano-wire cutter 18 is moved across the molding plate 17, thus cutting the strings of the food material.

Now the constructions of the aforementioned hand-type oil hydraulic pump 8 and the oil hydraulic cylinder 10 will be described in detail. The casing 8a of the oil hydraulic pump 8 is substantially in the shape of a rectangular prism. As shown in FIGS. 3, 5 and 6, a pump cylinder 20 with its front open is disposed inside the casing 8a on the right-hand side thereof. Contained in the pump cylinder 20 is a piston 21 which can move along the axis of the pump cylinder 20, i.e. back and forth. The forward end of the piston 21 is rockably coupled with the rear end of a link 22 by means of a pin 23. As for the handle lever 9, as shown in FIGS. 2 to 5, it has a boss portion 9a bent in the vicinity of its lower end portion. A kerf portion 8b is defined at the front portion of the casing 8a on the right-hand side thereof. The bent portion of the handle lever 9 is mounted on a pivot 24 inside the kerf portion 8b. Thus, the handle lever 9 can be rocked around the pivot 24. The bottom end of the boss portion 9a of the handle lever 9 and the front end of the link 22 are rockably coupled by means of a pin 25, and the piston 21 is caused to move back and forth inside the pump cylinder 20 with the aid of the link 22 by rocking the handle lever 9. Defined in the casing 8a, as shown in FIGS. 5 and 6, is an oil passage 26 one end of which opens into the rear end portion of the pump cylinder 20. The middle portion of the oil passage 26 communicates with an oil inlet passage 28 by means of an inlet valve 27. The other end of the oil passage 26 communicates with an oil discharge passage 30 by means of a discharge valve 29.

Figure 4:
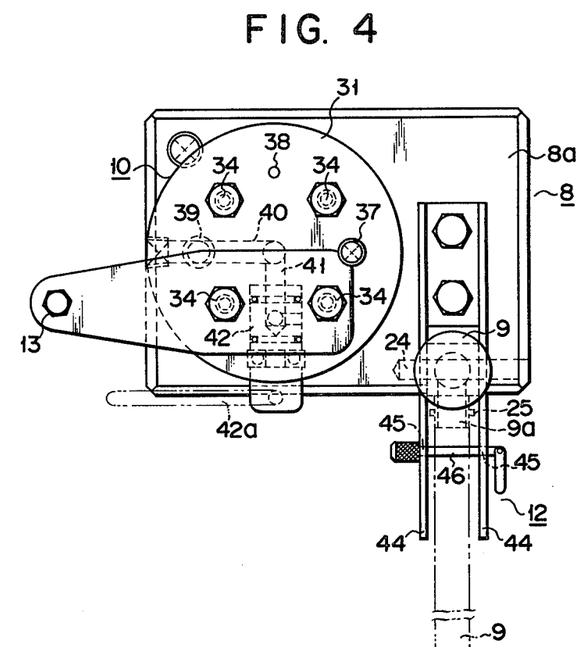
FIG. 4 is a plan view showing a hand-type oil hydraulic pump and an oil hydraulic cylinder.
Figure 5:
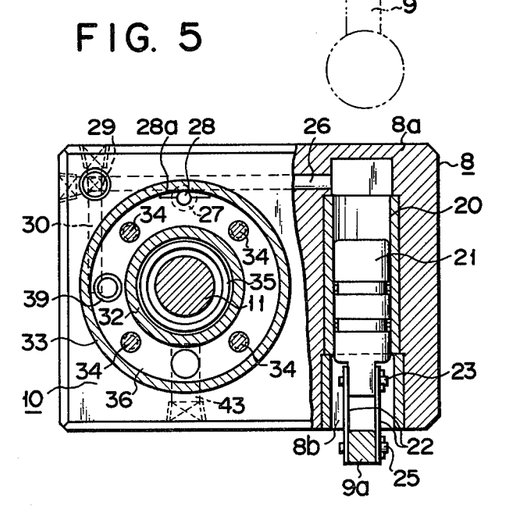
FIG. 5 is a plan view partially in cross section showing the part shown in FIG. 4.
Figure 6:
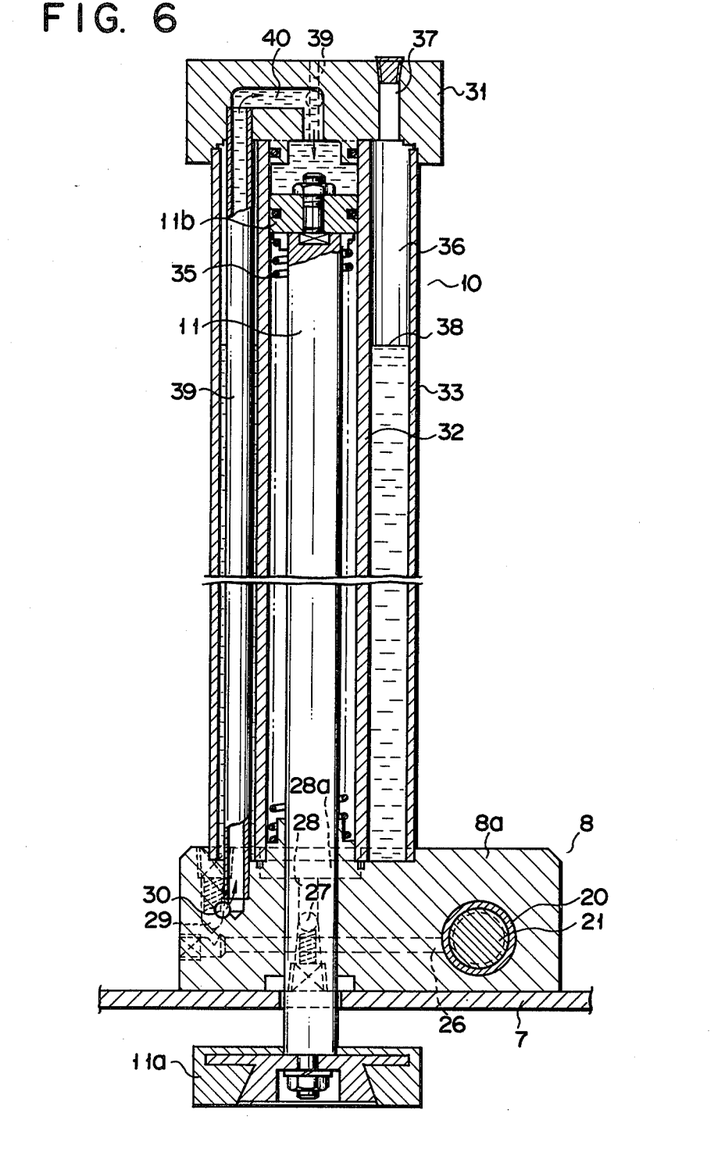
FIG. 6 is a vertical cross section of the part shown in FIG. 4.

As shown in FIGS. 4 to 6, the oil hydraulic cylinder 10 is of a double-wall construction. Namely, the oil hydraulic cylinder 10 includes an inner cylinder 32 and an outer cylinder 33 disposed coaxially around the inner cylinder 32 at a space therefrom. The respective lower and upper ends of the inner and outer cylinders 32 and 33 are fitted closely in the casing 8a and a top head 31, respectively. The top head 31 is fixed to the top of the casing 8a at a given space therefrom by means of four screw rods 34. The piston rod 11 is disposed inside the inner cylinder 32. A large-diameter piston portion 11b is attached to the upper end of the piston rod 11. The outer circumferential surface of the piston portion 11b is in slide contact with the inner circumferential surface of the inner cylinder 32. The lower end portion of the piston rod 11 extends downward through the casing 8a and the pump mounting base 7 so as to be able to move vertically. Inside the inner cylinder 32, a return spring 35 is wound around the piston rod 11. The upper and lower ends of the spring 35 are engaged to the under side of the piston portion 11b and the top side of the casing 8, respectively, and the piston rod 11 is always thrusted upward by the urging force of the spring 35.

The space defined between the inner and outer cylinders 32 and 33 serves as an oil reservoir 36 in which oil as mentioned later is stored through an oil inlet port 37 with a screw plug formed in the top head 31, as shown in FIGS. 4 and 6. The oil reservoir 36 communicates with the open air by means of an air inlet-outlet port 38 formed in the top head 31. Further, the lower portion of the oil reservoir 36 communicates with the oil inlet passage 28 by means of an inlet port 28a formed at the upper end of the passage 28. An oil discharge pipe 39 vertically extends through the oil reservoir 36, and an oil induction passage 40 is defined in the top head 31. The lower and upper ends of the oil discharge pipe 39 communicates with the forward end of the oil discharge passage 30 and the oil induction passage 40, respectively. As shown in FIG. 6, the oil induction passage 40 communicates with a cylinder chamber surrounded by the inner wall of the inner cylinder 32, the top of the piston portion 11b, and the under side of the top head 31 so that oil is forced into the chamber. The oil induction passage 40 has an oil return passage 41 which diverges from the oil induction passage 40 to open into the oil reservoir 36. As shown in FIG. 4, a return valve 42 is disposed in the middle of the oil return passage 41 so that the passage 41 can be opened and closed by operating a return lever 42a. As shown in FIGS. 2 and 5, moreover, the casing 8a is provided with an oil exhaust port 43 with a screw plug which communicates with the oil reservoir 36. The oil exhaust port 43 is unplugged and opened to exhaust the oil 38 in the oil reservoir 36 only for an oil change or internal cleaning.

In such oil exhaust, the piston 21 inside the pump cylinder 20 is moved forward by rocking the handle lever 9 of the hand-type oil hydraulic pump 8 from the position shown in FIG. 1 to the substantially vertical position shown in FIG. 3 where the handle lever 9 is prohibited from further backward rocking. The movement causes the oil 38 in the oil reservoir 36 to be sucked from the oil inlet passage 28 through the oil passage 26 into the pump cylinder 20 by means of the inlet valve 27. In this state, when the handle lever 9 is rocked forward to be pulled down, the piston 21 inside the pump cylinder 20 is moved backward to discharge the oil in the pump cylinder 20. The discharged oil is fed from the oil passage 26 into the cylinder chamber of the oil hydraulic cylinder 10 through the oil discharge passage 30, the oil discharge pipe 39, and the oil induction passage 40 by means of the discharge valve 29. The piston rod 11 is forced down against the urging force of the return spring 35 by the pressure of the fed oil. As a result, the bottom pressing plate 11a of the piston rod 11 presses the molding food material (dough) with the aid of the push cover 14 in the drum 15 set as shown in FIGS. 2 and 3. The pressed material is extruded from the perforations 17a of the molding plate 17. The extrusions of material, hanging like strings, are quickly cut by the piano-wire cutter 18. The cut strings of material are received as raw materials by a tray (not shown). Like extrusions of molding food material can be produced by repeatedly operating the handle lever 9 of the pump 8, and a great number of strings (raw materials) can be prepared by cutting these extrusions by means of the piano-wire cutter 18. Thus, by repeating the pump handling and cutting operations, the strings (raw materials) can be produced successively until the molding food material in the drum 15 is used up. In doing this, the rocking operation of the handle lever 9 can be smoothly performed even by a woman, requiring no great energy due to the use of oil pressure. Moreover, the oil functions as a lubricant to smooth the actions of the contact portions and engaging portions, so that there will be no fear of malfunction even after prolonged use of the machine.

When the molding food material in the drum 15 is used up, the return valve 42 is opened by operating the lever 42a. By the release of the return valve 42, the oil in the cylinder chamber inside the inner cylinder 32 is returned to the oil reservoir 36 through the oil return passage 41. Namely, the oil pressure is removed, and the piston rod 11 is raised or returned to the position shown in FIGS. 2 and 3 by the urging force of the return spring 35. Thus, the drum 15 can be removed to be loaded with another lot for resetting.

Now the handle operation stroke regulating mechanism 12 will be described in detail. This regulating mechanism 12 is provided for optionally defining the rocking stroke (rocking angle) of the handle lever 9 of the hand-type oil hydraulic pump 8, and as shown in FIGS. 2 to 4, includes which are fixedly standing on the casing 8a so as to face each other with the handle lever 9 between them, a multitude of regulating perforations 45 formed at short intervals each other in both these regulating plates 44, and a stopper pin 46 capable of being inserted in any desired facing pair of regulating perforations 45 in the two regulating plates 44. Abutting against the stopper pin 46 inserted in any specified pair of regulating perforations 45, the handle lever 9 is prohibited from further forward rocking. The movable angular range of the handle lever 9 may be adjusted by changing the position of the stopper pin 46 plugged in the regulating perforations 45. Thus, the moving stroke of the piston 21 in the pump cylinder 20, the oil discharge rate based on the moving stroke, and the descending stroke of the piston rod 11 of the oil hydraulic cylinder 10 based on the oil discharge rate depend on the adjustment of the movable range of the handle lever 9. Accordingly, the length of the extrusions of molding food material from the perforations 17a of the molding plate 17 can be adjusted as required.

Corresponding graduations or signs (not shown) are marked on the outer surfaces of the regulating plates 44 in the vincinity of the individual regulating perforations 45. The stopper pin 46 is plugged in a pair of regulating perforations 45 corresponding to a desired extrusion length that are detected by means of a chart (separately provided as an accessory although not shown) prepared by calculation. By such setting of the stopper pin 46, raw materials with the desired extrusion length can be obtained at once without repeating trial preparation. Moreover, the molding operation can be continued thereafter with the same extrusion length. Even if the molding plate is replaced with another molding plate having perforations different in shape, size, and number, the length of the raw materials can be regulated at once by determining the plugging position of the stopper pin 46 in accordance with the graduations or signs and the chart.

As for the oil used in the hand-type oil hydraulic pump 8, it need be safe from the viewpoint of food sanitation in the food producing machines of this type and be capable of prolonged use. Accordingly, it is advisable to use, for example, medium-chain fatty acid triglyceride which is edible and, unlike salad oil susceptible to oxidative polymerization, has stability to oxidation.

Figure 7:
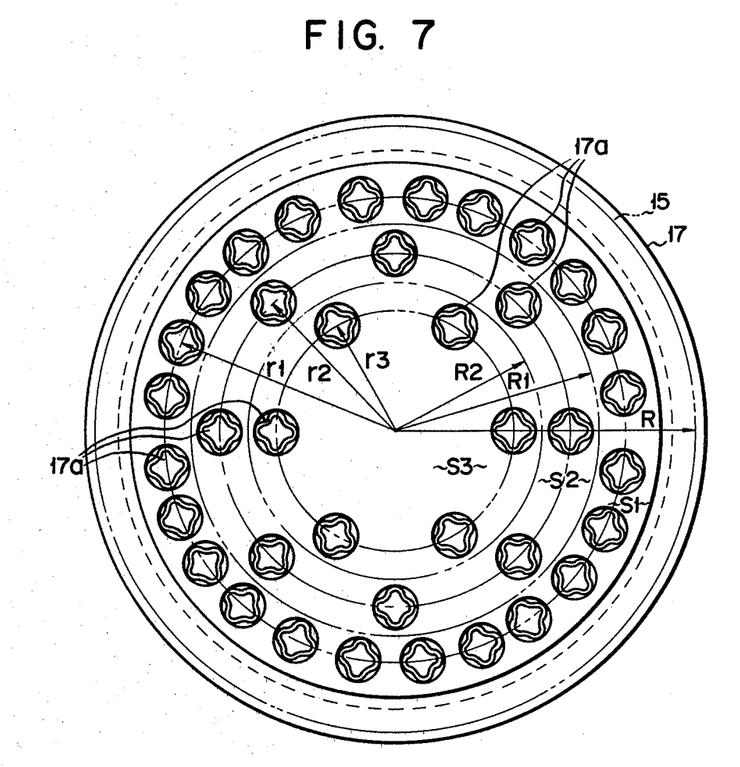
FIG. 7 is a plan view of a molding plate used in the food extruder of FIG. 1.
Figure 8:
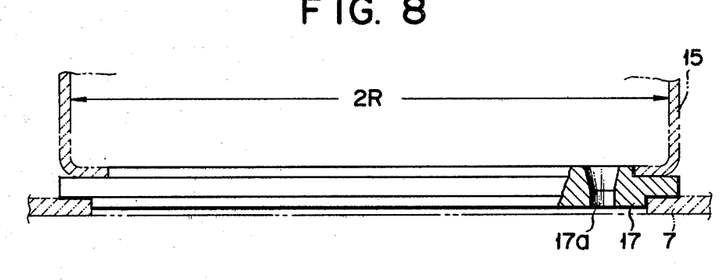
FIG. 8 is a side view of the molding plate of FIG. 7, partially in longitudinal section.

Now the molding plate 17 will be described in detail. As shown in FIGS. 7 and 8, the molding plate 17 has the multitude of perforations 17a for molding the molding food material (dough) prepared by mixing powder material with water into desired sectional shape and size. According to a prior art food extruding machine of this type, the extrusion lengths of strings (raw materials) extruded from the perforations 17a are substantially uniform where the drum 15 is loaded with sufficient molding food material. Where the molding food material remaining in the drum 15 is little, however, the respective lengths of the strings (raw materials) will vary from one another; strings (raw materials) extruded from the peripheral perforations will be longer than strings from the central perforations. Especially in preparing various kinds of flat molding food products other than sticklike products, unevenness in the extrusion lengths or thicknesses of strings (raw materials) would be conspicuous.

According to the aforementioned embodiment of the present invention, as a result of pursuit of causes of such problem, the perforations 17a are arranged so as to produce food strings having a uniform length. The pursuit has revealed that the unevenness in the extrusion length of the strings (raw materials) is attributable to the difference between the perforations 17a of the molding plate 17 in the ability to be supplied with the molding food material. This phenomenon may be attributed to the difference between the areas surrounding the individual perforations 17a. Basically, therefore, it is necessary to minimize the difference between the surrounding conditions of the perforations 17a. To attain this, the opening ratio P of the opening area S of a single perforation 17a to the overall area (content sectional area capable of being calculated as $\pi R^2$ from the inside radius R of the drum 15) $S_T$ of the molding plate 17 required for proper pressurization of the molding food material is determined first. Generally, the opening ratio P need be set within a range from 0.10 to 0.20. If the number of perforations 17a formed in the molding plate 17 is N, the opening ratio P is given by $$P = \frac{N \cdot S}{S_T}. \qquad (I)$$

From eq. (I), we obtain $$N = \frac{P \cdot S_T}{S}, \qquad (II)$$

whereby the total number N of the perforations 17a arranged in the molding plate 17 is calculated. Perforations 17a of the calculated number N are formed at regular intervals in the molding plate 17 so that the ratio of the opening area of each perforation to its corresponding surrounding area is fixed.

According to a simple method, N perforations 17a may be arranged in the molding plate 17 as follows. As shown in FIGS. 7 and 8, for example, a plurality of perforations 17a are arranged at regular intervals along the circumferential direction on the respective circumferences of several, e.g. three, circles concentric with the molding plate 17 where the molding plate 17 is circular in shape. The radii r1, r2 and r3 of these concentric circles and the numbers n1, n2 and n3 of the perforations arranged on the respective circumferences of the circles are determined as follows.

First, circumference border lines with radii R1 and R2 given by $$R1 = \frac{r1 + r2}{2}, R2 = \frac{r2 + r3}{2}$$

are supposed to lie between the circumferences corresponding to the radii r1, r2 and r3. Then, the areas S1, S2 and S3 of a doughnut-shaped region defined by the respective circumferences of the circles with the radii R and R1, a doughnut-shaped region defined by the respective circumferences of the circles with the radii R1 and R2, and the circle with the radius R2 are given by $$S1 = \pi R^2 - \pi R1^2 - \pi R2^2,$$

$$S2 = \pi R1^2,$$

$$S3 = \pi R2^2.$$

Here we have $$\frac{S1}{n1} = \frac{S2}{n2} = \frac{S3}{n3} = \frac{S_T}{N} = k \text{ (constant)} \quad \text{(III)}$$

$(S_T = S1 + S2 + S3, N = n1 + n2 + n3)$

Accordingly, we obtain $$\frac{\pi R^2 - \pi R1^2}{n1} = \frac{\pi R1^2 - \pi R2^2}{n2} = \frac{\pi R2^2}{n3} = \frac{\pi R^2}{N} = \quad \text{(IV)}$$

$k$ (constant).

If the radii r1, r2 and r3 and the numbers n1, n2 and n3 are severally selected so as to satisfy eq. (IV), then the lengths of the extrusions of molding food material from the perforations 17a will be uniform.

Now there will be given specific numerical values for illustrating the embodiment. In order to obtain strings (raw materials) of a desired size, each perforation 17a is formed in the shape of a square with a side length of 0.8 cm. Then, the opening area S is 0.8 cm × 0.8 cm. Meanwhile, if the radius R of the drum 15 and the opening ratio P are given by R = 8 cm and P = 0.12, respectively, the total number N of perforations is calculated as follows:

$$N = \frac{P \cdot S_T}{S} = \frac{P \times \pi R^2}{S} = \frac{0.12 \times \pi \cdot 8^2}{0.8 \times 0.8}$$

$$= 37.68 \approx 38.$$

Thus, the total number N of perforations is defined as 38.

Subsequently, the 38 perforations 17a are separately arranged on the circumferences of the three circles on the molding plate 17. The numbers of perforations on these individual circumferences are defined as n1 = 24, n2 = 8, and n3 = 6, respectively. Substituting these values into eq. (IV), we obtain $$k = \frac{\pi R^2}{N} = \frac{\pi 64}{38} = 1.68\pi.$$

$$1.68\pi = \frac{\pi R^2 - \pi R1^2}{n1} = \frac{\pi(R^2 - R1^2)}{n1}$$

$$= \frac{\pi(8^2 - R1^2)}{24}.$$

$\therefore R1^2 = 64 - 40.32 = 23.68.$ $\therefore R1 = 4.87$ (cm).

Likewise, we obtain $R2 = 3.17$ (cm).

Then, r2 as the intermediate value between R1 and R2 are calculated as follows:

$$r2 = \frac{R1 + R2}{2} = \frac{4.87 + 3.17}{2} = 4.02 \text{ (cm)}.$$

Accordingly, the difference between R1 and r2 is $R1 - r2 = 4.87 - 4.02 = 0.85$ (cm). Based on the value of such difference, r1 and r3 are calculated as follows:

$r1 = R1 + 0.85 = 5.75$ (cm), $r3 = R2 - 0.85 = 2.32$ (cm).

Thus, strings (raw materials) with a uniform length can be obtained from any of the perforations 17a by forming the perforations 17a of the numbers n1, n2 and n3 on the circumferences of the circles with the radii r1, r2 and r3 on the molding plate 17, respectively. Moreover, the strings (raw materials) obtained are subject to no variations in length from the first cuts extruded from the drum 15 filled with the molding food material to the last cuts.

This invention is not limited to the abovementioned embodiment, and various changes and modifications may be effected therein by one skilled in the art without departing from the scope or spirit of the invention. In the above embodiment, powdered or mashed potatoes for French fried potatoes are used as the molding material. Alternatively, there may be used powdered sweet potatoes, green peas, yellow peas, soybeans, or buckwheat flour, for example. Further, the perforations can be of a shape other than the square shape.

What is claimed is:

1. A food extruder comprising:
   (a) a molding plate provided with a plurality of spaced perforations therethrough, with each perforation having a prescribed opening area;
   (b) a drum having open upper and lower ends for engaging the molding plate and containing molding food material to be extruded through the molding plate;
   (c) a push cover disposable within the drum for pressing the molding food material against the molding plate;
   (d) an oil hydraulic pump having a movable piston rod for applying pressure to the push cover;
   (e) an operating member for supplying pressurized oil to the piston rod for moving same;
   (f) a regulating mechanism for establishing the stroke length of the operating member;
   (g) a cutting mechanism for cutting the molding food material extruded from the molding plate upon completion of the established stroke length of the operating member; and
   (h) the perforations being disposed in discrete concentric regions of the molding plate wherein the number of perforations in each of said regions is calculated by the formula $$N = \frac{P \cdot S_T}{S}$$

with p equal to a given constant, $S_T$ is the overall area $\pi R^2$ of said molding plate and S is the open area of a single perforation, and a ratio of total opening area of the perforations to total surface area of the molding plate is determined for each of said discrete concentric regions of the molding plate so as to provide the molding plate with the perforations and to provide for the production of food material extrudates having a uniform length upon actuation of the operating member through its established stroke length.

2. The food extruder of claim 1 wherein:
(a) the molding plate is of a circular configuration;
(b) the drum is of a cylindrical configuration; and
(c) the molding plate includes an overall area equal to the internal transverse crosssectional area of the drum.

3. The food extruder of claim 2 wherein:
(a) a first ratio of the number of perforations allocated to each of the discrete concentric regions of the molding plate to the area of each region is identical with a second ratio of the total prescribed opening areas to the overall area of the molding plate; and
(b) the required number of perforations is determined through multiplying the second ratio by the overall area of the molding plate and dividing the resulting product by the prescribed opening area.

4. The food extruder of claim 3 wherein the second ratio is within a range of from about 0.10 to 0.20.

5. The food extruder of claim 1 wherein the oil is edible and not susceptible to oxidative polymerization.

6. The food extruder of claim 5 wherein the oil is triglyceride.

7. The food extruder of claim 6 wherein the oil is a medium chain fatty acid triglyceride.

* * * * *